US012792392B2

(12) United States Patent
Padma et al.

(10) Patent No.: US 12,792,392 B2
(45) Date of Patent: Nov. 10, 2026

(54) END TO END BATCH CYCLE MONITORING ACROSS HETEROGENEOUS DATA SOURCES

(71) Applicant: State Street Corporation, Boston, MA (US)

(72) Inventors: Ravindra Pundlik Padma, Glen Mills, PA (US); Jassi P. Singh, Short Hills, NJ (US); Vladyslav Luchenko, Davenport, FL (US); Bhoopendra Singh Chauhan, Kalyan West (IN); Varun Bhaaskar, Tiruchirappalli (IN)

(73) Assignee: STATE STREET CORPORATION, Boston, MA (US)

(*) Notice: Subject to any disclaimer, the term of this patent is extended or adjusted under 35 U.S.C. 154(b) by 683 days.

(21) Appl. No.: 17/837,367

(22) Filed: Jun. 10, 2022

(65) Prior Publication Data

US 2023/0409378 A1 Dec. 21, 2023

(51) Int. Cl.

| | |
|---|---|
| ***G06F 9/48*** | (2006.01) |
| ***G06F 3/06*** | (2006.01) |
| ***G06F 9/54*** | (2006.01) |
| ***G06F 11/30*** | (2006.01) |
| ***G06F 11/362*** | (2025.01) |

(52) U.S. Cl.

CPC .......... *G06F 9/4843* (2013.01); *G06F 3/0604* (2013.01); *G06F 3/0653* (2013.01); *G06F 3/0685* (2013.01); *G06F 9/542* (2013.01); *G06F 11/3006* (2013.01); *G06F 11/3636* (2013.01)

(58) Field of Classification Search

CPC ........ G06F 9/4843; G06F 9/542; G06F 9/541; G06F 3/0604; G06F 3/0685; G06F 3/0605; G06F 3/067; G06F 11/3006; G06F 11/3636; G06F 11/3017; G06F 11/3068; G06F 11/324; G06F 11/3419

USPC .......................................................... 718/101

See application file for complete search history.

(56) References Cited

U.S. PATENT DOCUMENTS

| | | | | |
|---|---|---|---|---|
| 2002/0032590 A1* | 3/2002 | Anand | G06Q 10/063 | 705/348 |
| 2006/0017954 A1* | 1/2006 | Ly | G06F 3/1207 | 358/1.13 |
| 2009/0031312 A1* | 1/2009 | Mausolf | G06F 9/5072 | 718/102 |
| 2010/0242099 A1* | 9/2010 | Tsao | H04L 67/75 | 709/229 |
| 2010/0306020 A1* | 12/2010 | Lo | G06Q 10/0633 | 715/764 |
| 2014/0324497 A1* | 10/2014 | Verma | G06Q 10/063114 | 705/7.15 |

(Continued)

*Primary Examiner* — Tuan C Dao

(74) *Attorney, Agent, or Firm* — Goodwin Procter LLP

(57) ABSTRACT

Exemplary embodiments may provide end to end monitoring of the batch cycle processing in a computational environment, such as an application network. The exemplary embodiments may correlate a client facing workload with jobs in the batch cycle processing being performed by the application network. This correlation may be used to identify the effects failures or problems with the jobs have on the client facing workload. Information regarding the effects may be provided to the client via a user interface so that the client is informed in real time or near real time of any computational problems and is informed of how the computational problems are effecting the client facing workload.

17 Claims, 13 Drawing Sheets

(56) References Cited

U.S. PATENT DOCUMENTS

| | | | | |
|---|---|---|---|---|
| 2015/0379430 | A1* | 12/2015 | Dirac | G06N 20/00<br>706/12 |
| 2016/0162478 | A1* | 6/2016 | Blassin | G06Q 10/063112<br>706/12 |
| 2017/0011322 | A1* | 1/2017 | Thomas | G06Q 10/067 |
| 2017/0193349 | A1* | 7/2017 | Jothilingam | G06N 20/20 |
| 2019/0362248 | A1* | 11/2019 | Rogynskyy | G06Q 10/107 |
| 2020/0028734 | A1* | 1/2020 | Emigh | H04L 41/0668 |
| 2021/0037113 | A1* | 2/2021 | Wang | G06F 9/5022 |
| 2021/0390495 | A1* | 12/2021 | Upadhyay | G06F 9/5016 |

* cited by examiner

END TO END BATCH CYCLE MONITORING ACROSS HETEROGENEOUS DATA SOURCES

BACKGROUND

Many businesses provide information to clients regarding client accounts and the like. Typically businesses rely upon application networks to provide the backend processing to provide such information to the clients. The application networks may span multiple applications and multiple job scheduling tools. The application networks typically use batch processing to run high volume repetitive computational jobs.

Monitoring at the job level in such application networks is desirable but has proven to be difficult with conventional approaches. Such conventional approaches may provide monitoring that is limited to a single scheduling tool, and the monitoring cannot span heterogeneous scheduling tools. In addition, the monitoring is limited to the computational jobs. There is no information provided to the client regarding the associated client-facing workload. As a result, it is not possible for businesses to understand how the underlying technology component issues (such as a job failure or delay) impact the client-facing workload.

SUMMARY

In accordance with an inventive facet, a method is performed by one or more processors. The method includes obtaining status data regarding jobs that are running in an application network from heterogenous data sources. The method further includes, for a selected one of the data sources, applying a set of rules for the selected data source to transform the data from the selected data source to a standard format. The method additionally includes storing the transformed data in the standard format in a database and generating a user interface that displays status for a cycle of a given client. The cycle is a business process, and milestones are subdivisions of the cycle. The user interface is generated from the transformed data stored in the database and a mapping of the jobs to milestones and milestones to cycles. Lastly, the method includes causing the user interface to be displayed on a display device.

The user interface may include an indication that one of the cycles is executing on time or that one of the cycles is delayed in executing. The user interface may include an indication that a current milestone is being executed. The user interface may include an indication of the milestones of the cycle that have at least begun to execute. The generating of the user interface may include using the mapping to determine what jobs are part of a selected milestone and determining the status of the jobs that are part of the selected milestone to determine the status of the selected milestone. The generating of the user interface may include using the mapping to determine what milestones are part of the cycle and determining the status of the cycle based on the statuses of the milestones determined to be in the cycle. The obtaining of the status data regarding the jobs may include making an Application Program Interface (API) call to obtain the status data from a selected one of the heterogeneous data sources. The status data regarding the jobs may be obtained from a job scheduling tool that schedules the jobs for execution. The heterogenous data sources comprise different types of job scheduling tools.

Computer programming instructions that when executed by a processor of a computing device cause the processor to perform the method may be stored on a non-transitory computer-readable storage medium.

In accordance with another inventive facet, a method is performed by a processor of a computing device. The method includes storing a mapping in a storage in device wherein the mapping includes an identification of milestones for a business process and an identification of what computational jobs are executed to realize the respective milestones. The method also includes receiving status data regarding at least some of the jobs. The method additionally includes, based on the status data and the mapping, identifying a subset of the milestones for which the computational jobs for realizing the milestones have at least begun executing and processing the status data to determine whether the respective milestones in the subset of the milestones have been delayed or are on time. The method further includes displaying a user interface on a display device that indicates whether the milestones in the subset of milestones have been delayed or are on time. The user interface may also display status information regarding a cycle that contains multiple of the milestones.

DETAILED DESCRIPTION

Exemplary embodiments may provide end to end monitoring of batch cycle processing in a computational environment, such as an application network. The exemplary embodiments may correlate a client-facing workload with jobs in the batch cycle processing being performed by the application network. This correlation may be used to identify the effects failures or problems with the jobs have on the client-facing workload. Information regarding the effects may be provided to the client via a user interface so that the client is informed in real time or near real time of any computational problems and is informed of how the computational problems are effecting the client facing workload.

In order to correlate the client-facing workload with the batch processing, the exemplary embodiments may break the batch processing for a client-facing workload into cycles, where each cycle represents a batch of jobs that may be processed in aggregate. A job represents an elemental schedulable quantity of computational operations. The exemplary embodiments may further break down each cycle of the workload into milestones, with each milestone marking a noteworthy action or a noteworthy event in the client facing workload achieved by the executing jobs. Lastly, the milestones may be mapped to jobs that are executed to realize the milestones. The exemplary embodiments may store information regarding the correlation in mappings of cycles with clients, milestones with cycles and jobs with milestones.

An example is helpful in illustrating the correlating of a client facing workload with the batch processing. Suppose a client relies on a business for investment servicing. The client may wish to know end of business information about assets in an investment portfolio in Asia. The cycle in this case would be the processing needed for the Asian portfolio component. One milestone would be pricing to get the final prices of the assets at the close of the markets in Asia. A number of jobs would be executed to realize such a milestone. The correlation realized via the mappings helps the client to know, for example, if pricing is going to be delayed or is on time as a result of certain ones of the jobs being delayed.

The exemplary embodiments may gather status data or events across heterogeneous data sources. The exemplary embodiments may have rules for transforming data from each type of data source to a common neutral format that may be stored in a database. Information in the database may be used to determine the status of cycles and milestones. A machine learning model may perform analytics on the data in the database. The status of the cycles and milestones may be displayed on a user interface to the client in real time or in near real time.

Figure 1:
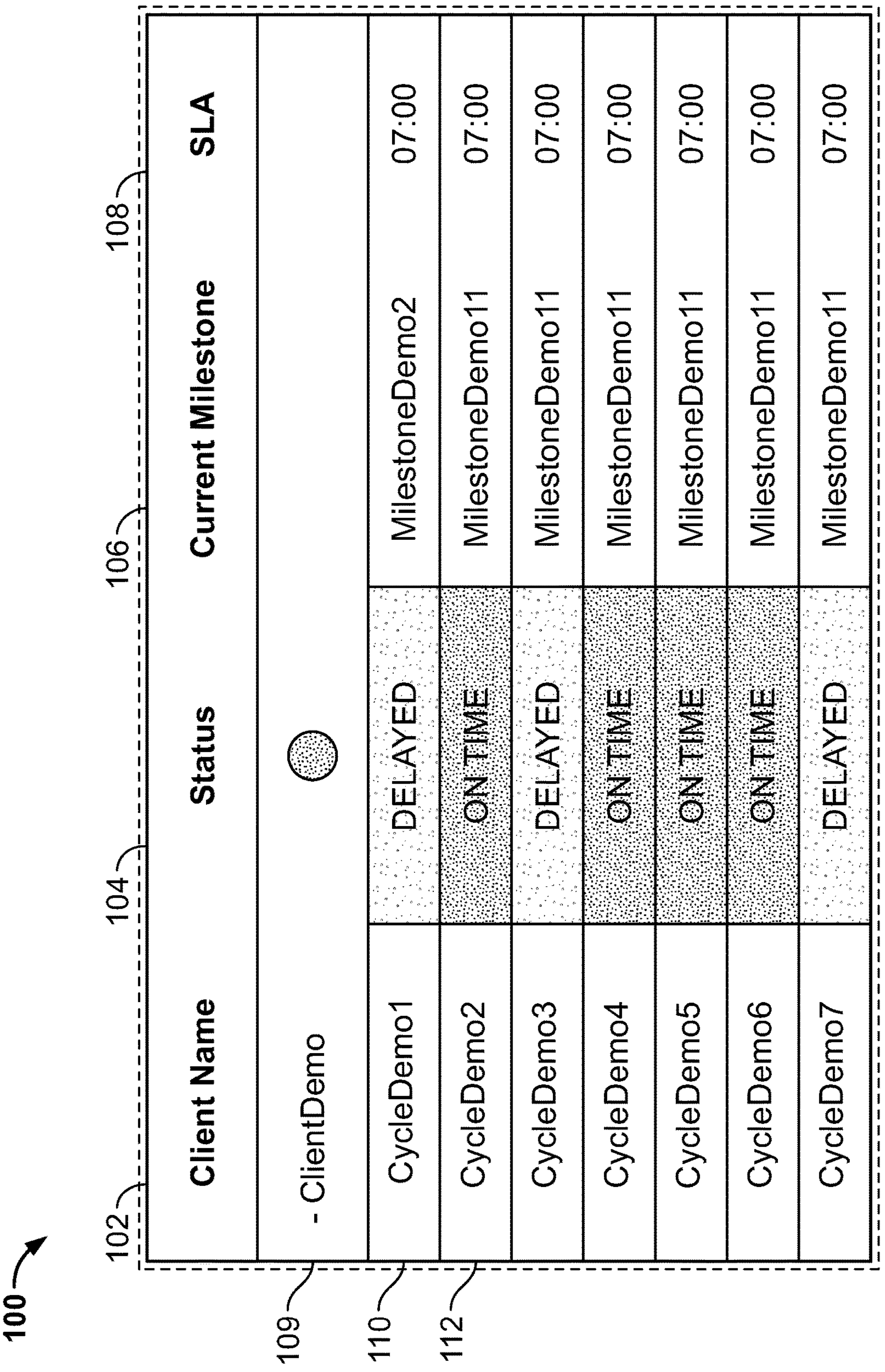
FIG. 1 depicts an illustrative user interface for a client that depicts the status of workloads and associated cycles in exemplary embodiments.

FIG. 1 depicts an illustrative user interface 100 that may be generated and displayed in exemplary embodiments. The user interface 100 is arranged in tabular form. The user interface 100 may include a column 102 for a client name, a column 104 for a status indicator, a column 106 for specifying a current milestone, and a column 108 for specifying that the data should be delivered by the listed time as set forth in the service level agreement (SLA) with the client. Each row is associated with a client or a cycle for a client. Row 109 displays information for the client "ClientDemo" as indicated under the client name column 102 for that row 109. A status indicator in the status column 104 indicates that the processing for the client is on time. The status indicator is a colored circle that has a color indicative of the client processing being on time or being delayed. Other colors may indicate, for instance, failure or different status information.

The row 109 for the client "ClientDemo" has been expanded as indicated by the minus sign to show additional rows for the cycles for the client. For example, row 110 is for the cycle "CycleDemo1". The name of the cycle is listed in column 102 and a status indicator indicating that the cycle is delayed is shown. The milestone "MilestoneDemo2" is listed in column 106 to indicate that it is the current milestone for CycleDemo. The current milestone is the milestone for which current jobs are executing to achieve the milestone. Row 112 hold information for CycleDemo2. The status indicator in column 104 indicates that the cycle is currently on time. The SLA column indicates that per the service level agreement (SLA) the cycles are to be completed by 7:00 pm ET.

Figure 2:
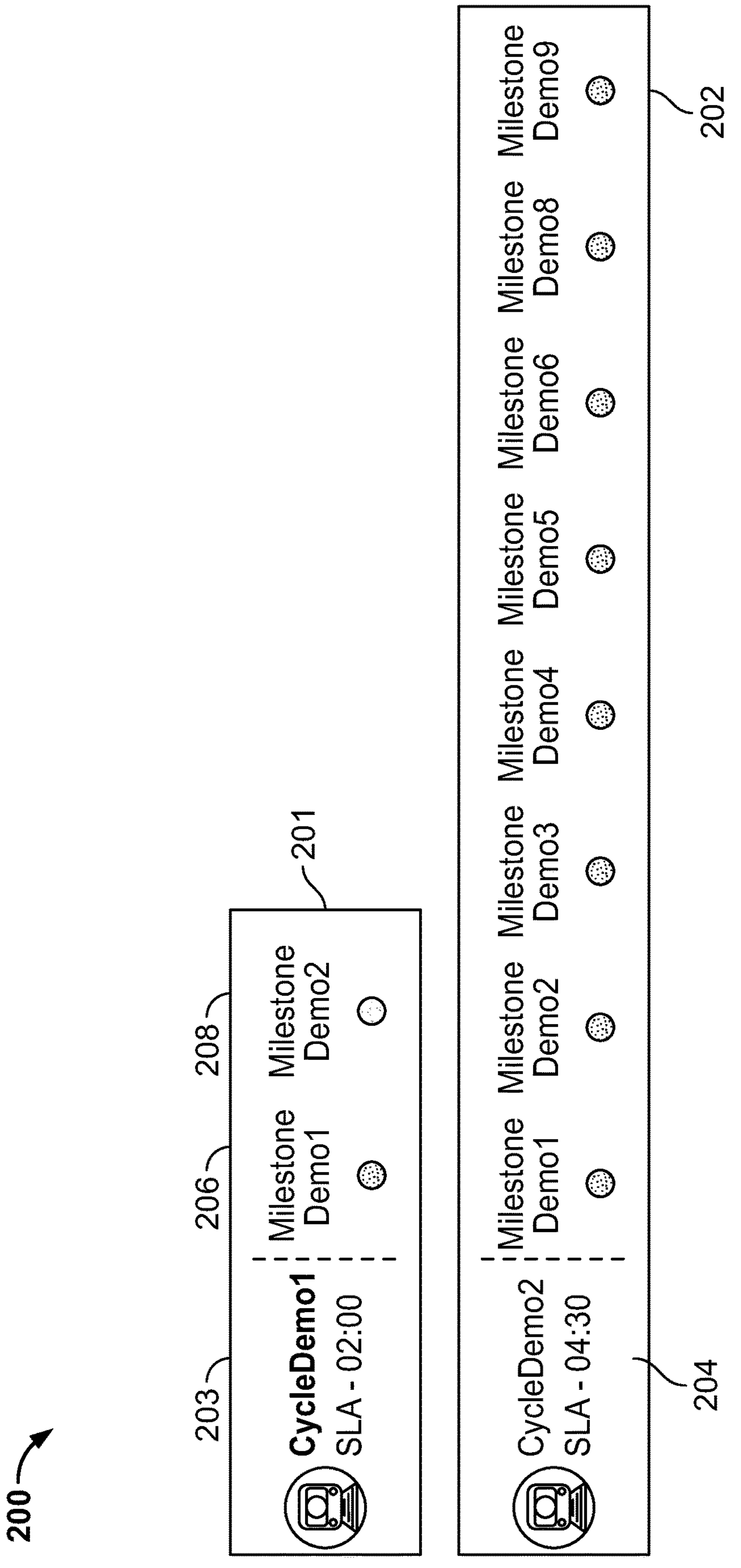
FIG. 2 depicts an illustrative user interface for a client that depicts status indicators for milestones of cycles in exemplary embodiments.

Additional information about the milestones also may be obtained from the user interface. FIG. 2 shows an illustrative user interface 200 providing additional status information regarding the milestones. In this user interface 200, the cycles have respective rows 201 and 202. Row 201 is for CycleDemo1, and row 202 is for CycleDemo2. Row 201 includes a header 203 that includes the name "CycleDemol" for the cycle and specifies SLA information of when the cycle is to be completed. Row 201 includes a status indicator 206 for MilestoneDemo1 and a status indicator for MilestoneDemo2. The status indicators 206 and 208 are colored circles, where the color indicates the status, such as on time or delayed. Status indicators only the milestones that have been at least started are shown. Row 204 is for CycleDemo2 and is expected to complete in 4 hours and 30 minutes. Eight milestone status indicators are depicted for CycleDemo2.

From the user interfaces 100 and 200, a client may review what cycles are associated with the client and whether the client-facing workload is executing on time or not. The client may review the status of the cycles. In addition, a client may see which milestones are part of a cycle, which milestones have been completed and which milestones completed on time. Thus, the user gains a better understanding of how the jobs affect milestones and the cycles. In addition, the client may gain a better understanding of whether there any delays or problems on an on-going basis across the batch processing cycles executing on the application network.

It should be appreciated that the user interfaces 100 and 200 are merely illustrative and are not intended to be limiting. The user interfaces may assume different forms than depicted in FIGS. 1 and 2. Moreover, the user interfaces may depict additional information mor different information than that shown.

Figure 3:
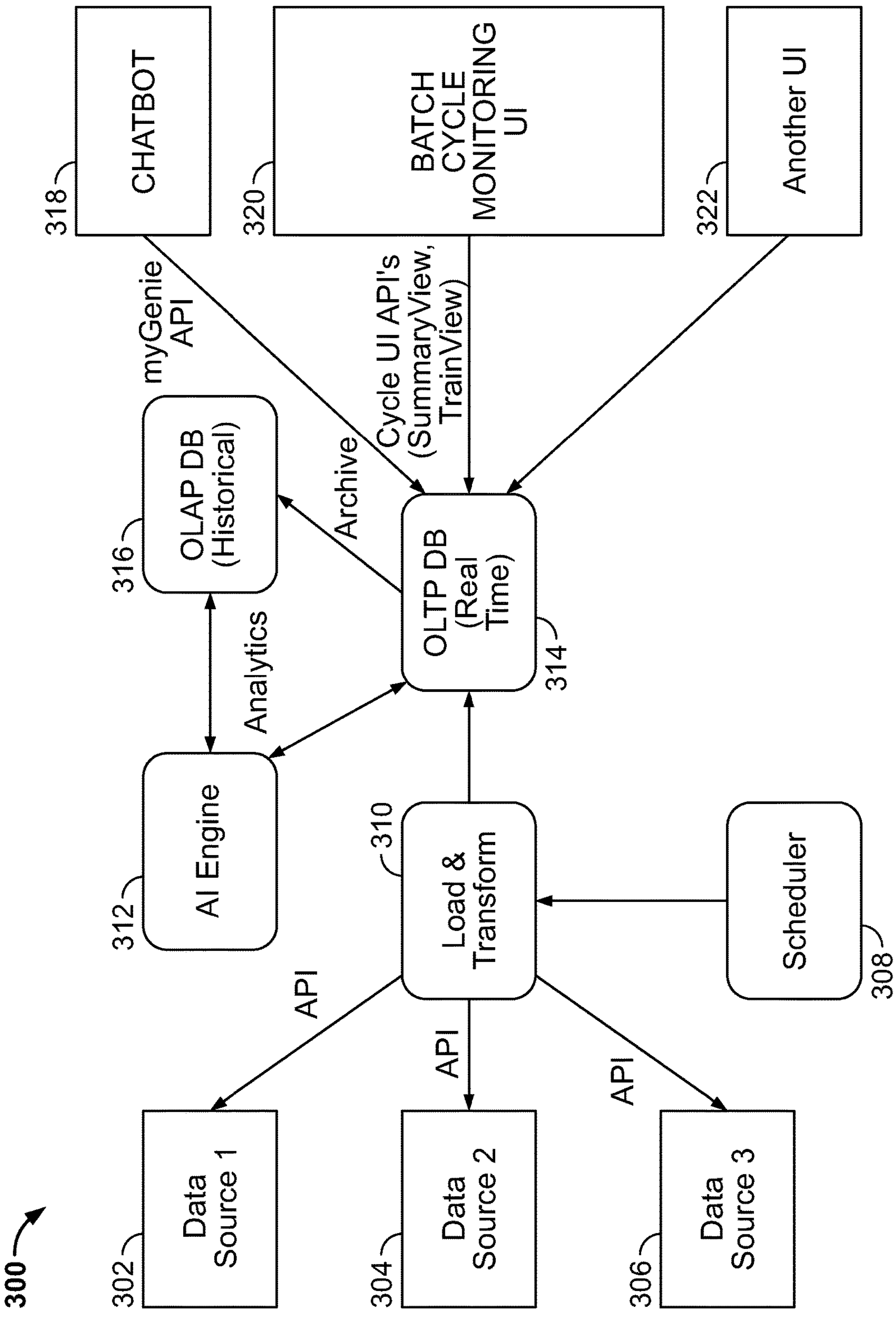
FIG. 3 depicts a diagram of components that facilitate end to end batch cycle monitoring in exemplary embodiments.

FIG. 3 depicts a block diagram of functional components for providing the end to end batch cycle monitoring in exemplary embodiments. Data sources 302, 304 and 306 provide status data and events that are processed to understand the status of jobs, milestones, cycles and processing for clients. The data sources may be scheduling tools, monitoring tools, application databases or the like that may provide status data and/or events. Load and Transform module 310 is response for pulling the status data and/or events, transforming the data and/or events into a neutral common format which is stored in online transaction processing (OLTP) database 314. The load and transform module 310 may use API calls to obtain the data from the data sources 302, 304 and 306. The data sources 302, 304 and 306 may be heterogeneous in that the data may be produced in different formats by different types of tools, such as different types of scheduling tools. The data sources 302, 304 and 306 may be resident on computing resources, such as on separate servers or clusters. The Load and Transform module 310 may use information obtained from scheduler 308.

The OLTP database 314 may be intentionally kept small so that data stored therein may be quickly retrieved. The OLTP database 314 may hold, for example, two days of data that has been ingested from the data sources 302, 304 and 306. Once the data is over two days old, the data may be transferred to the online analytical processing (OLAP) database 316. The OLAP database 316 may be much larger to hold large amounts of historical data. The OLAP database 316 holds data for performing analytics and historical reporting. A machine learning model or another type of may be provided. The AI engine may perform analytics on data in the OLAP database. The AI engine may be trained based on historical data in the OLAP database. The results of the analytics may be stored in the OLTP database and used to generating the user interfaces 320 and 322. The analytics may analyze job status data or events and predict potential impacts to milestone end time and cycle end time. A chatbot 318 may be provided to answer natural language queries from a client based on data in the OLTP database 314.

Figure 4:
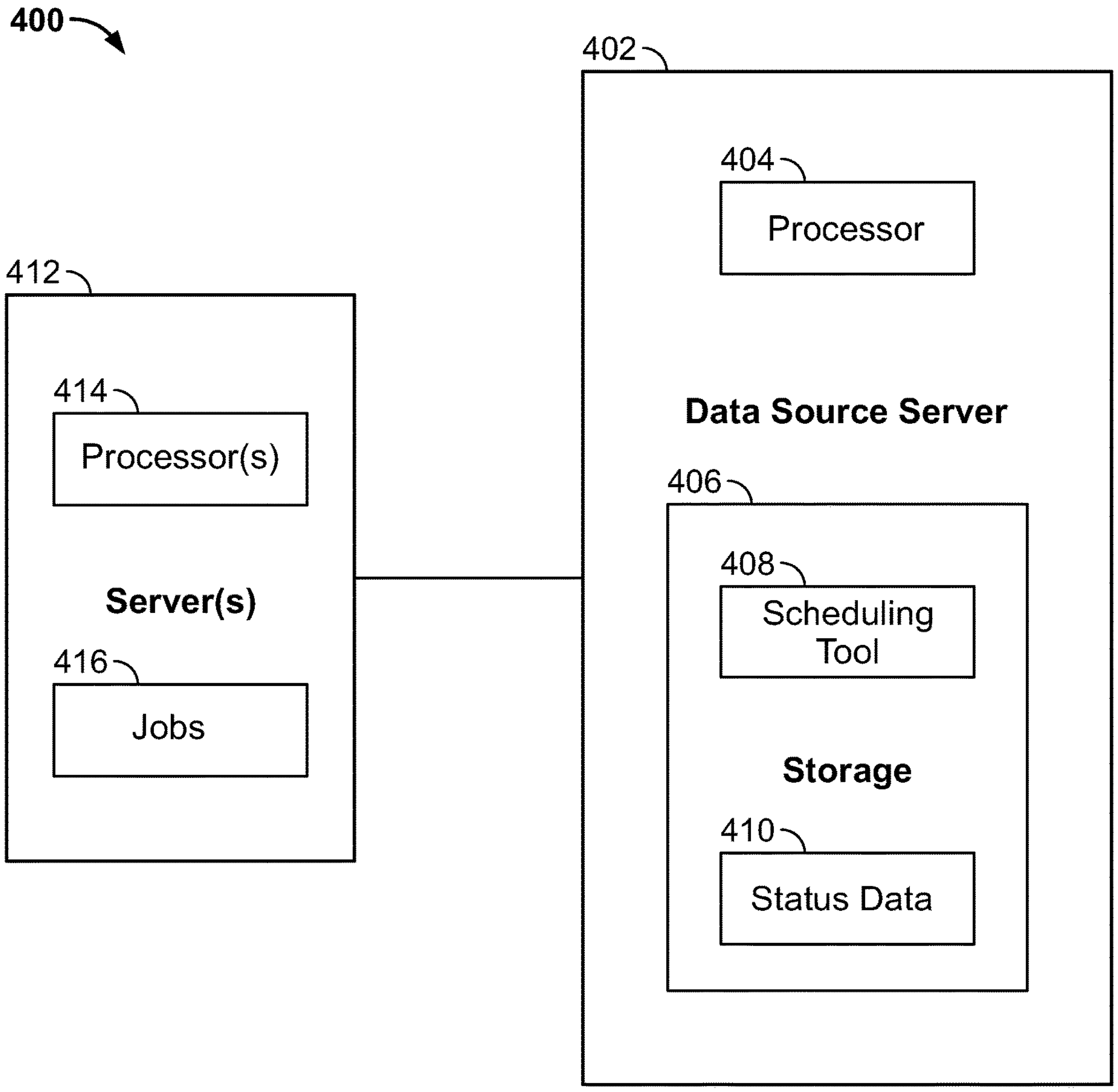
FIG. 4 depicts a block diagram of a data source server in exemplary embodiments.

FIG. 4 depicts a diagram of a data source server 402 that is suitable as one of the data sources 302, 304 and 306 in an exemplary embodiment. The data source server 402 may include a processor 404. The processor 404 may be, for example, a central processing unit (CPU), a graphics processing unit (GPU), an application specific integrated circuit (ASIC), a field programmable gate array (FPGA) or other type of microprocessor. The processor 404 may have access to a storage 406. The storage 406 may include non-transitory computer-readable storage media, such as types of random access memory, read only memory, solid state memory, magnetic disks, optical disks or the like. The 406 may store a scheduling tool that may be run on the processor to schedule execution of jobs 416. The storage may hold status data 410 including events relating to the jobs 416. The jobs 416 may run on processor(s) 414 of server(s) 412, including cloud computational resources.

Figure 5:
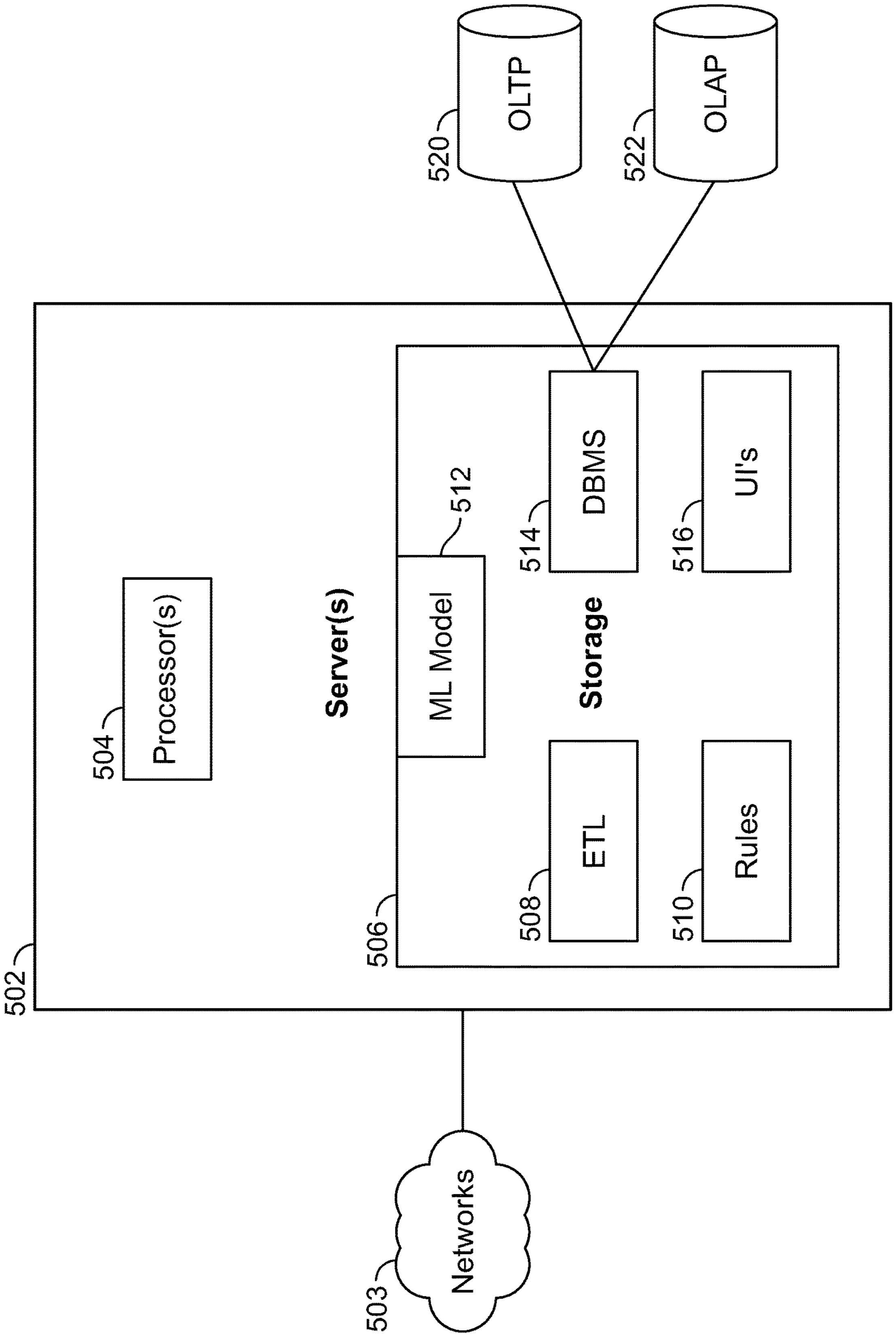
FIG. 5 depicts a diagram of illustrative server(s) in exemplary embodiments for processing and storing status data and/or events and generating the monitoring user interfaces.

FIG. 5 depicts a diagram of illustrative server(s) 502 that may be used in exemplary embodiments to perform operations relating to the processing and storage of the status data and/or events, The server(s) 502 may be a single server or multiple servers and may be connected to one or more networks 503. The server(s) include processor(s) 504 for executing computer programming instructions. The processor(s) 504 may take many forms, such as described above relative to processor 404. The processor(s) 504 may have access to a storage 506 and execute computer programing instructions stored therein. The storage 506 may include non-transitory computer-readable storage media of the forms described above relative to storage 406.

The storage 506 may store an extract, transform, and load (ETL) module 508 containing computer programming instructions for extracting status data and/or events from the data sources 302, 304 and 306 using API calls, transformed the extracted status data and/or events into a neutral format and storing the neutral format data in the OLTP database 314 as described above. The ETL module 508 corresponds to the load and transform component 310 of FIG. 3. The storage 506 also stores rules 510 used by the ETL 508 to transform the incoming status data and/or events into the neutral format. A separate set of rules may be provided for each type of data source.

The storage 506 may store a machine learning model 512, such as a neural network, for processing historical data in the OLAP database 522. The ML model 512 may perform analytics on the data and store the analytics results in the OLTP database 520. Such analytics results may be incorporated into the user interfaces 516, such as user interfaces 100 and 200. The storage 506 may store computer programming instructions for generating the user interfaces 516. The storage 506 may also store a database management system for managing the OLTP database 520 and the OLAP database 522.

Figure 6:
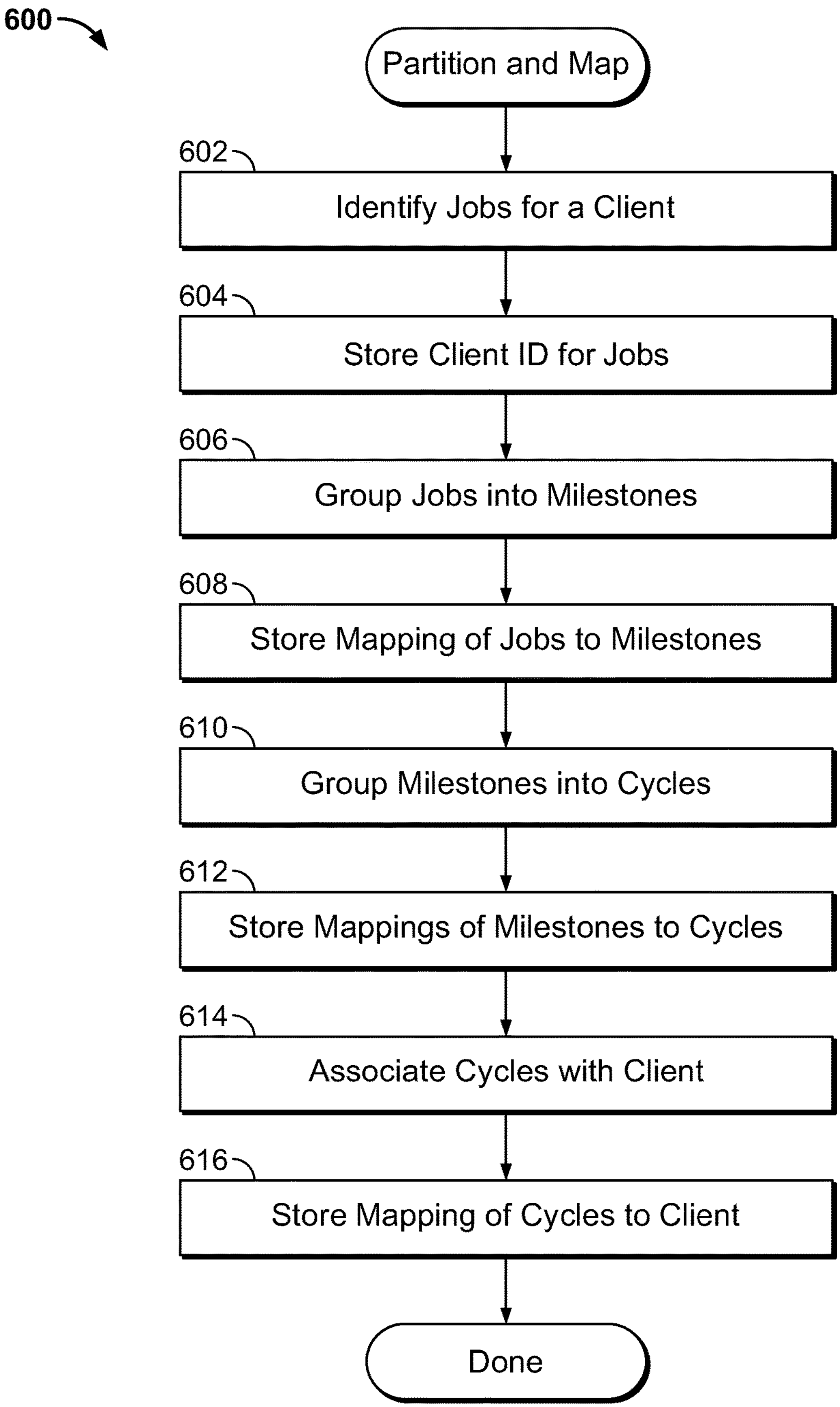
FIG. 6 depicts a flowchart of illustrative steps that may be performed in exemplary embodiments to partition a client workload and map jobs to the partitioned workload elements.

FIG. 6 depicts a flowchart 600 of illustrative steps that may be performed in exemplary embodiments to partition the client facing workload for a client into parts and correlate the parts with the underlying computational jobs. At 602, the computational jobs for a client are identified. At 604, the client ID for the client is stored for the jobs to associate the client with the job, such as in the OLTP database 314. At 606, related jobs are grouped into milestones. The related jobs help to achieve the milestones. At 608, the mapping of jobs to milestones is stored, such as in the OLTP database 314. At 610, milestones are grouped into cycles, and at 612 the mapping of milestones to cycles may be stored, such as in the OLTP database 314. At 614, the cycles are associated with (i.e., mapped) to the client. At 616, the mapping of cycles to clients is stored, such as in the OLTP database 314.

Consider the example of client for which a business must provide information regarding investment portfolios of a client. Computational job perform the activities needed to provide the information to the client. Suppose that the investment portfolios are in Asia, Europe and the United States. One cycle may be for Asia, another for Europe and a final one for the United States. A milestone for the Asian cycle may be pricing of assets. Thus, all of the jobs that perform the pricing of assets in Asia may be grouped into the pricing milestones. Other milestones may also be provided for the Asia cycle. Similar milestones may be defined for Europe and the United States. All of the mappings may be stored.

Figure 7:
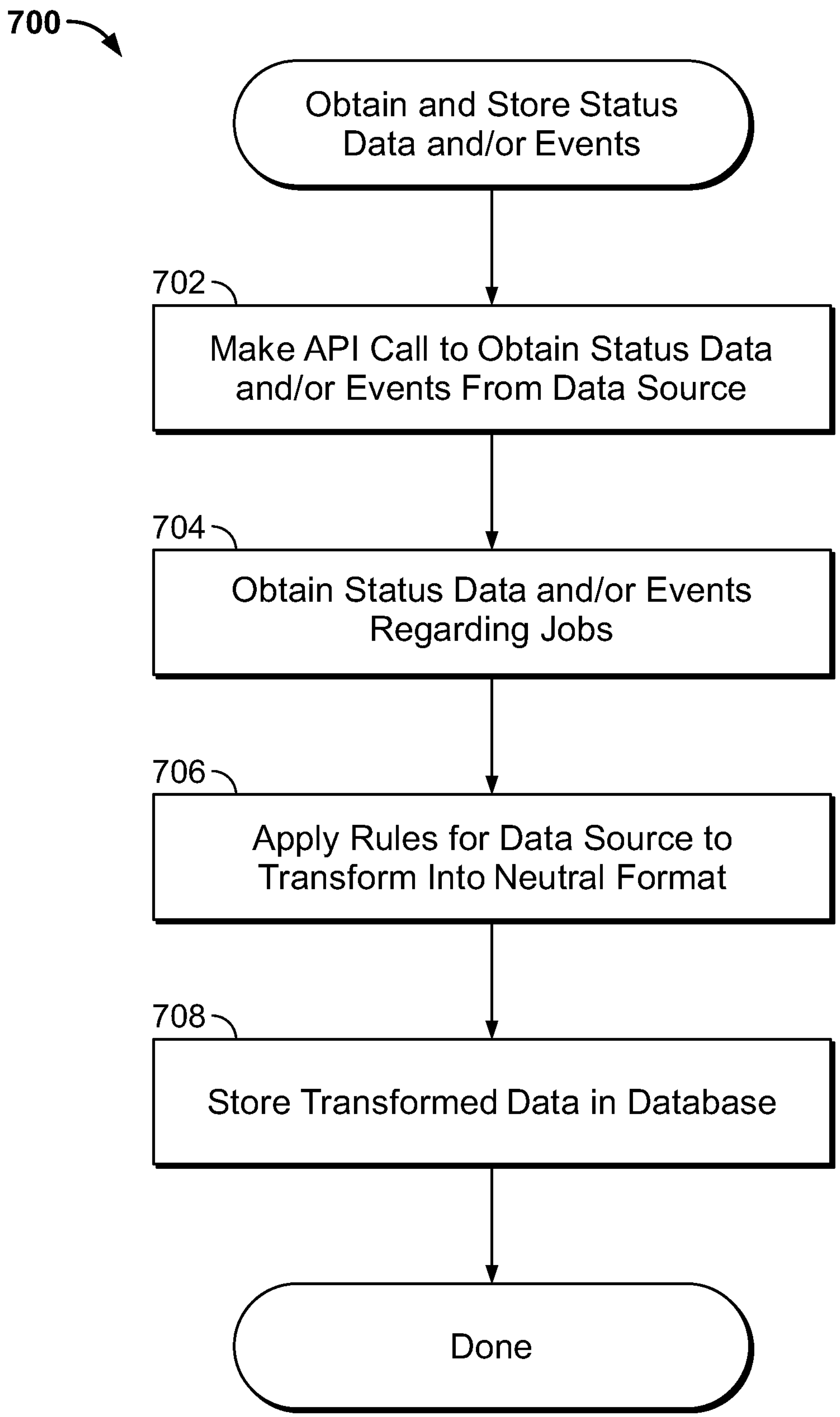
FIG. 7 depicts a flowchart of illustrative steps that may be performed in exemplary embodiments to obtain and store status data and/or events.

Once the jobs being executing the exemplary embodiments must obtain and store the status data and/or events. FIG. 7 depicts a flowchart of illustrative steps that may be performed in exemplary embodiments to obtain the status data and/or events and store the transformed neutral format data. At 702, API calls are made to a data source 302, 304 or 306 to obtain status data and/or events. At 704, the data is obtained by the load and transform module 310 responsive to the API call. At 706, the rules 510 are applied to transform the status data and/or events into a neutral format. The rules 510 largely transform the data so that it can be stored in the OLTP database 314 in objects of specified formats. At 708, the neutral format data is stored in the objects in the OLTP database 314.

Figure 8A:
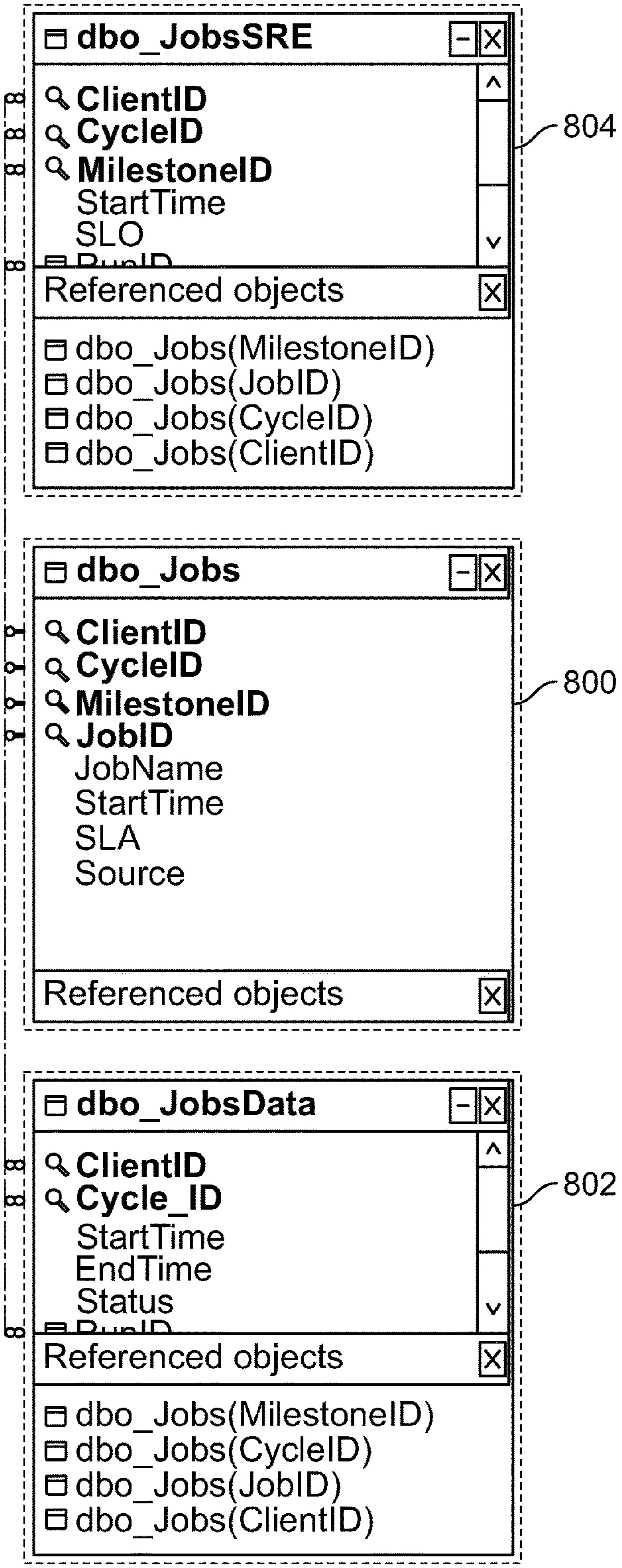
FIGS. 8A and 8B depicts illustrative schema for object classes for jobs, milestone, cycles and clients in the exemplary embodiments.
Figure 8A:
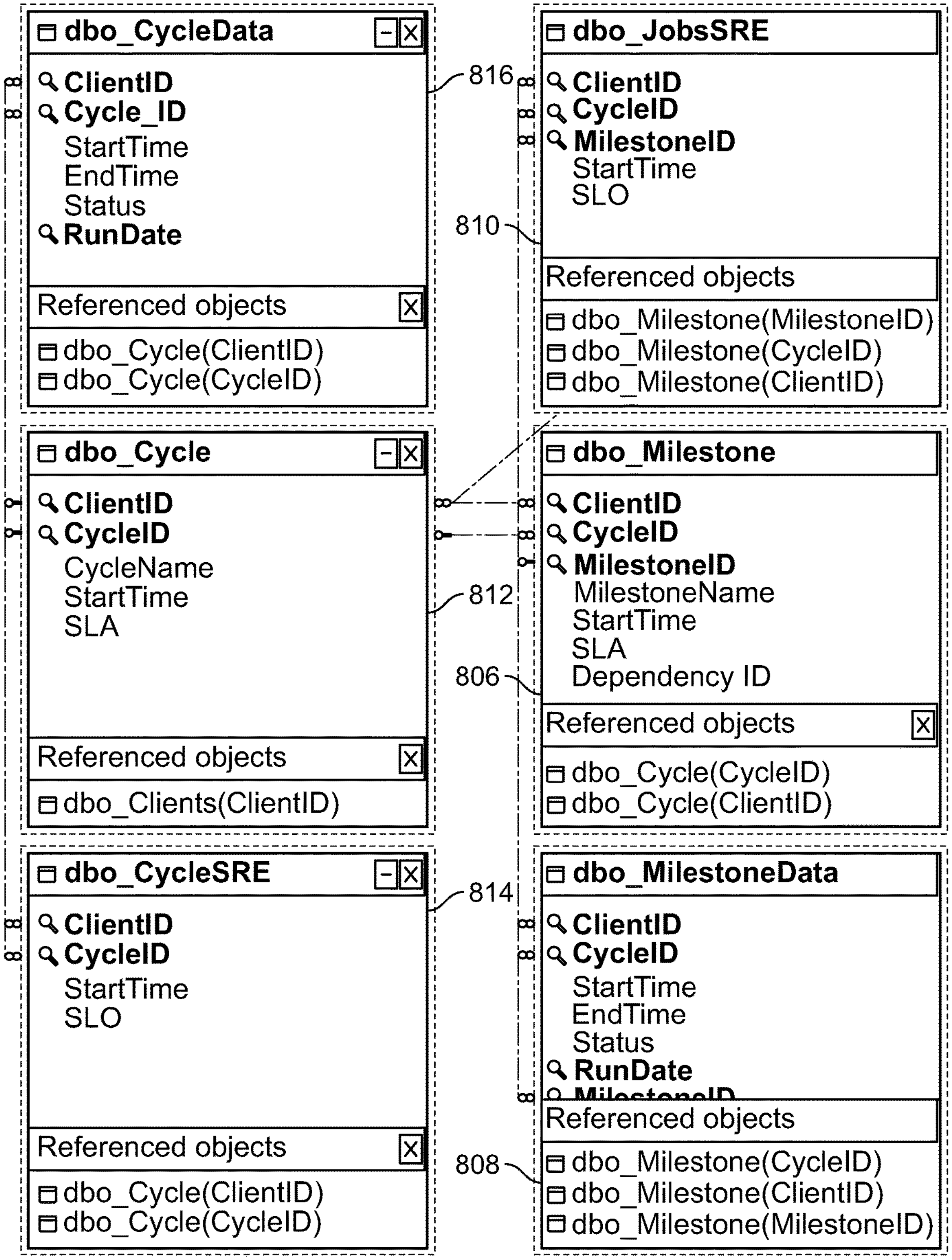
Figure 8B:
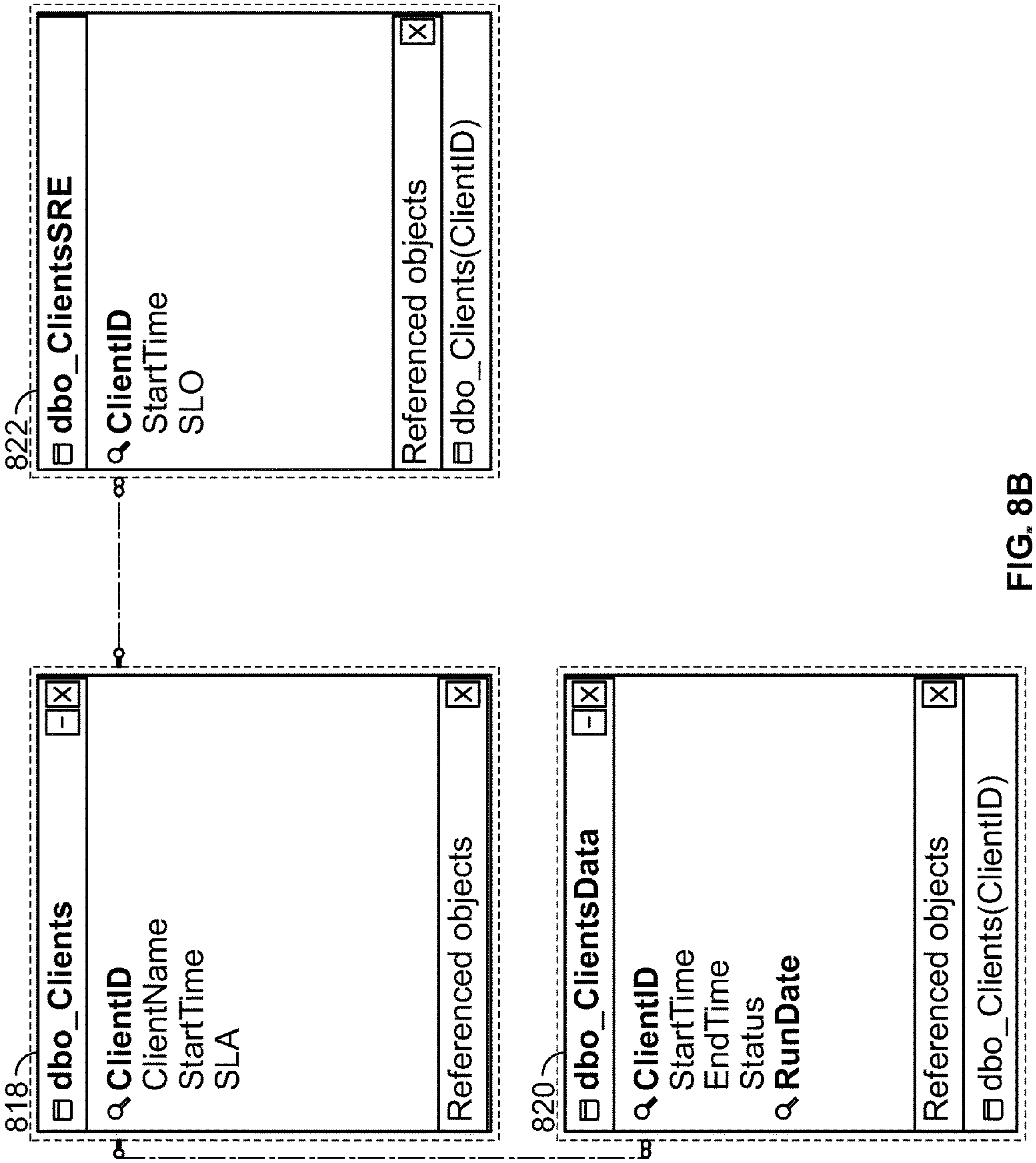

FIGS. 8A and 8B depicts an illustrative format for object classes for objects that may be stored in the OLTP database 314 and the OLAP database 316. These objects relate to clients, cycles, milestones and jobs. Three object classes are defined for jobs. An object of each of these object classes may be instantiated for each job. The associated client ID, cycle ID, milestone ID and jobID may be referenced in the objects. The dbo_Jobs object class 800 holds static data relating to jobs. The static data may include job name, scheduled start time, and the data source. The dbo_JobsData object class 802 defines an objects to hold dynamic data for the job. The dynamic data may include actual start time, actual end time and status, such as on time or delayed. The client ID and cycle ID may be referenced in the object. The dbo_JobsSRE object class 804 holds the analytical and predicted data for the job. The SLO field in the dbo_Jobs SRE object holds information regarding a service level objective (SLO) of the SLA. Each SLO is an internal performance target to be met for the job to achieve a higher level SLA. The SLO's may specify goals as things, such as availability, throughput, latency, etc. As was mentioned above, the AI engine 312 performs such analysis and prediction. The data field for this object class may include a predicted start time and a service level objective for the job.

Three object classes are defined for milestones. Instances of objects for these three object classes may be created for each milestone. The objects may reference the associated client ID, cycyle ID and milestone ID for the milestone. The dbo_Milestone object class 806 holds static data for a milestone. The static data may include a milestone name, a scheduled start time and a dependency ID. The dbo_MilestoneData object class 808 holds dynamic data, such as actual start time, actual end time and status. The dbo_MilestoneSRE object class may hold predicted and analytical data, such as predicted start time, SLO targets for the milestone and dependency ID information for jobs to identify the dependency among jobs. The dependency information can help identify how failure or delay of a job affects other jobs.

Three object classes are defined for cycles. Instances of objects for these three object classes may be created for each cycle. The objects may reference the associated client ID, and cycle ID for the associated cycle. The dbo_Cycle object class 812 holds static data for the cycle, such as cycle name and scheduled start time. The dbo_CycleData object class 816 holds dynamic data for the cycle, such as actual start time, actual end time and status. The dbo_CycleSRE object class 814 may hold predicted and analytical data for the cycle, such as the predicted start time and SLO targets for the cycle.

FIG. 8B depicts the object classes that may be defined for clients. Three object classes are defined for clients. Instances of objects for these three object classes may be created for each client. The objects may reference the associated client ID. The dbo_Clients object class 818 may hold static data for the client, such as client name and scheduled start time. The dbo_ClientsData object class 820 may hold dynamic data, such as actual start time, actual end time and status for the associated client. The dbo_ClientsSRE obeject class 822 may hold predicted and analytical data for the associated client, such as predicted start time and SLO targets for the client.

Figure 9:
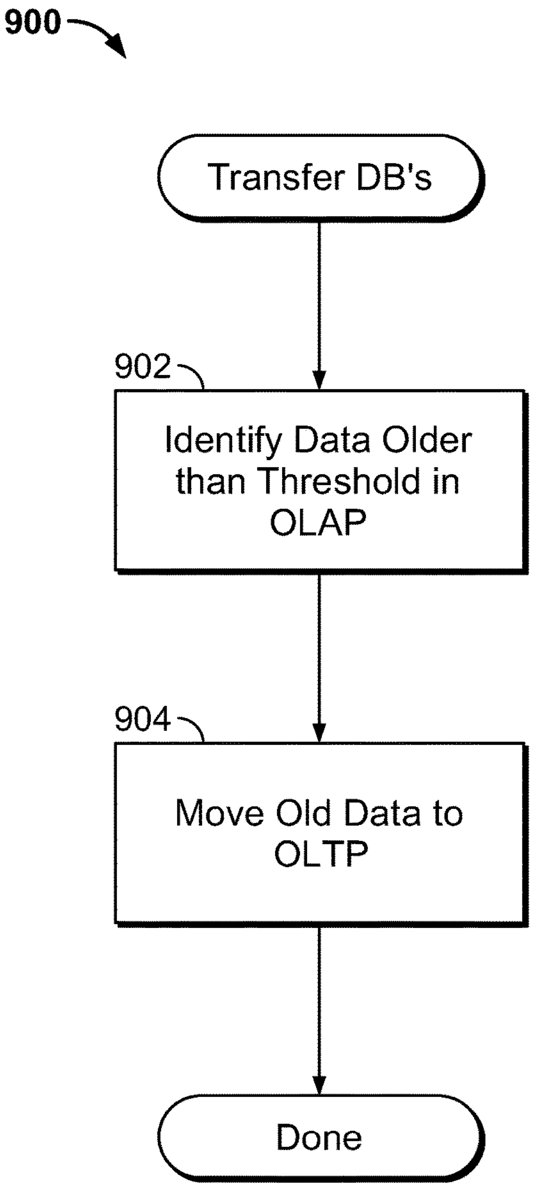
FIG. 9 depicts a flowchart of illustrative steps that may be performed in exemplary embodiments to transfer old data between databases in exemplary embodiments.

As was mentioned above, data may be moved from the OLTP database 314 to the OLAP database 316 when the data reaches a certain age. The movement of the data helps keep the OLTP small in size and thus, quicker to access. FIG. 9 depicts a flowchart 900 of illustrative steps that may be performed in exemplary embodiments to realize such transfers of database between the databases 314 and 316. At 902, data in the OLTP database 314 that is older than a threshold is identified. For example, data older than two days old may be identified. At 904, the identified older data is then transferred to the OLAP 316 database. The transfer may be performed, for example by the server(s) 502.

Figure 10:
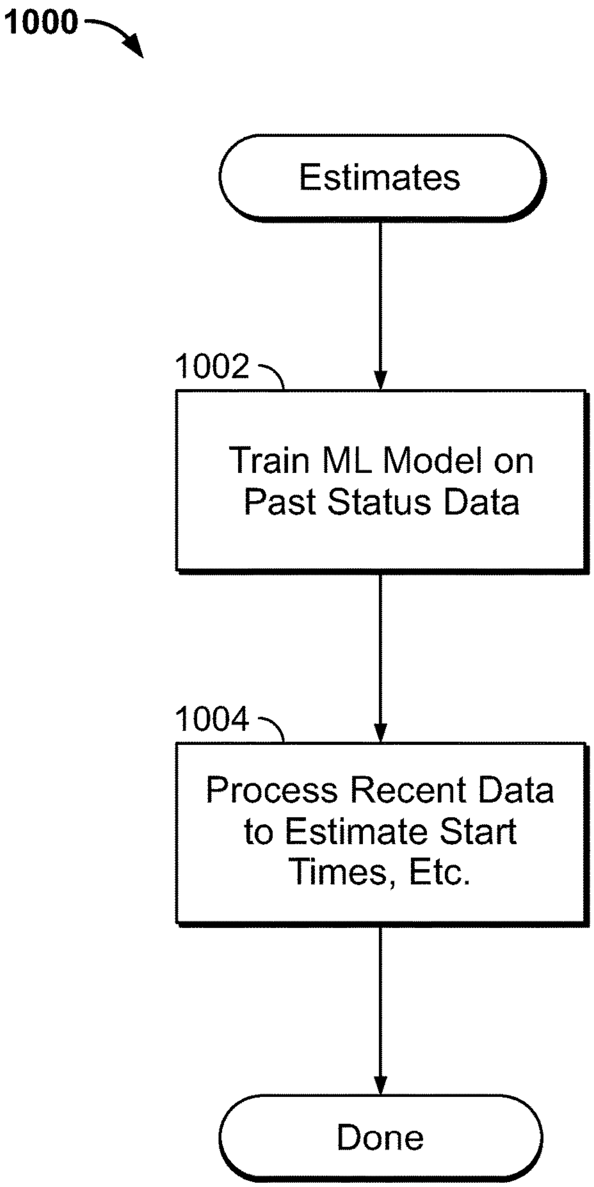
FIG. 10 depicts a flowchart of illustrative steps that may be performed in exemplary embodiments to generate estimates of start times.

As mentioned above, the AI engine 312 performs analytics and makes predictions. FIG. 10 depicts a flowchart of illustrative steps that may be performed to use the AI engine 312 to predict start times for jobs, cycle, milestones and/or client workload processing. Before the AI engine 312 may be used, the AI engine 312 must be trained. Thus, at 1002, the AI engine 312 may be trained on the past status data that is held in the OLAP database 314. Preferably, a large amount of data is used a training data. Based on this training, at 1004, the machine learning model of the AI engine may process data to estimate start times for jobs, milestones, cycles and clients and to adjust SLO's.

Figure 11:
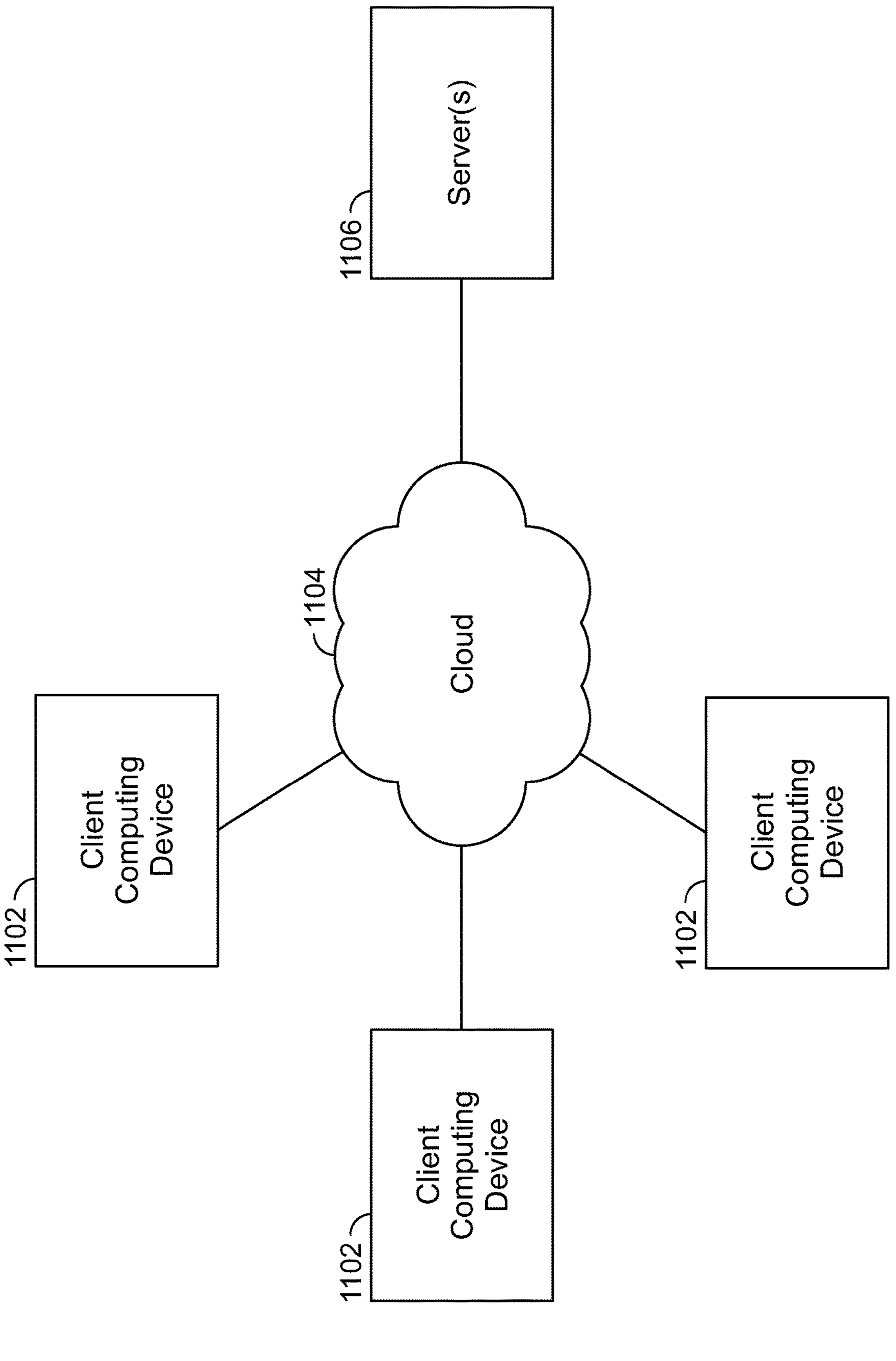
FIG. 11 depicts an illustrative networked environment for exemplary embodiments.

The exemplary embodiments may produce user interfaces, like 100 and 200, to provide the client with real time information regarding the status of work for a client, cycles and milestones for clients. The exemplary embodiments may use a networked computing environment like that shown in FIG. 11. As depicted, client computing devices 1102 for clients make be connected via network connections to server(s) 1106 (like 502). The server(s) 1106 may provide user interfaces like 100 and 200 to the clients in response to request from the clients issued from their client computing devices 1102. The network cloud 1104 is intended to represent the aggregate of the network connections to interconnect the client computing devices 1102 with the server(s) 1106. The network cloud 1104 may include local area networks, internet service provider networks, the Internet, an intranet and the like.

Figure 12:
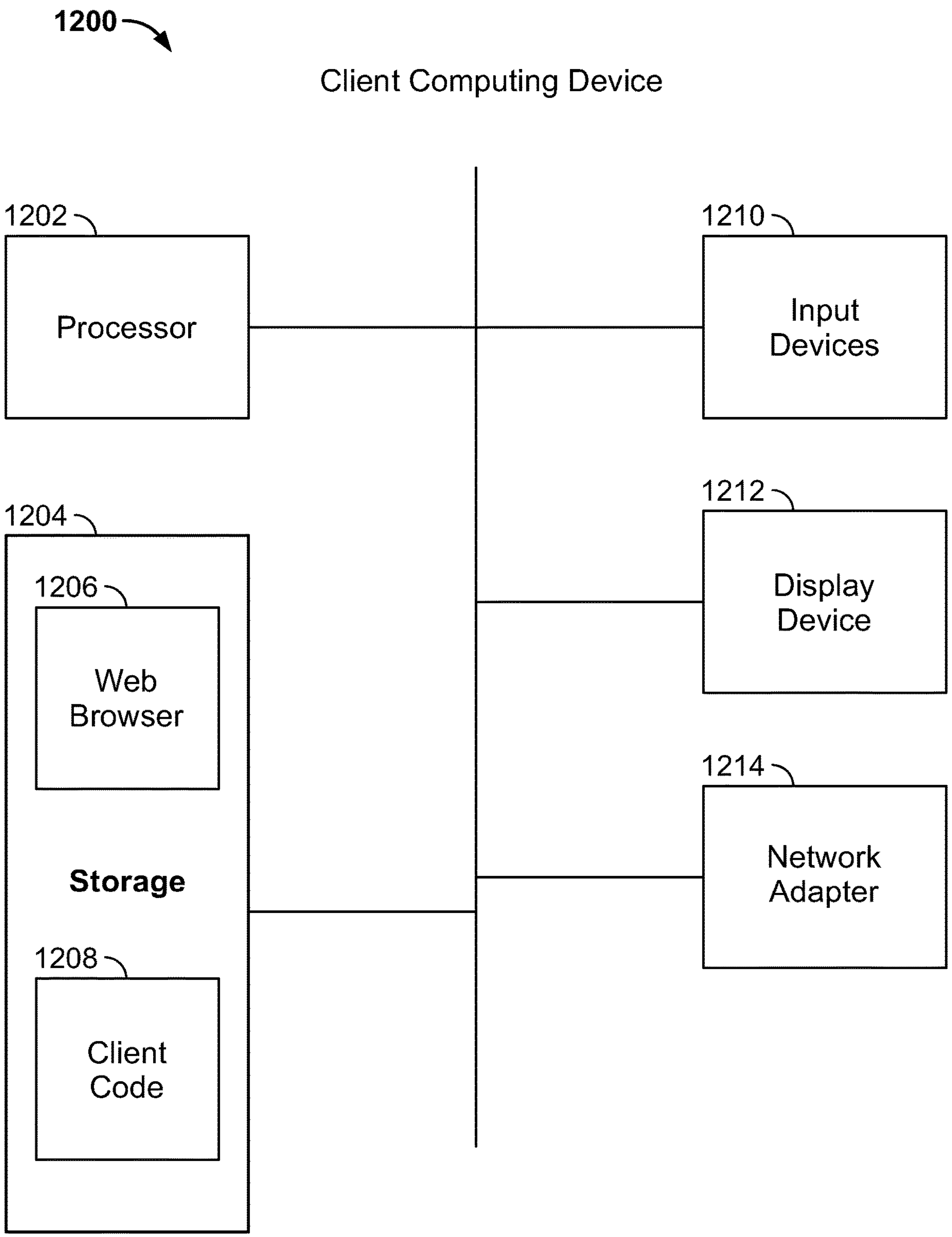
FIG. 12 depicts a diagram of an illustrative client computing device for exemplary embodiments.

FIG. 12 depicts a diagram of an illustrative client computing device 1200 that is suitable for exemplary embodiments. The client computing device 100 may include a processor 1202, like a CPU, GPU, ASIC or FPGA. The processor may execute computer programming instructions stored in storage 1204. The storage 1204 may include non-transitory computer-readable storage media, such as RAM, ROM, solid state memory, magnetic disks, optical disks and the like. The storage 1204 may include a web browser 1206 that may be used to access the server(s) 1106. In some instances, the storage may store client code 1208 for accessing the user interfaces and the server(s). The client computing device may include input devices 1210, such as a keyboard, a mouse, a thumbpad, a microphone, etc. The client computing device 1200 may include a display device for displaying user interfaces. The client computing device 1200 may include a network adapter 1214 for facilitating connection with networks.

While exemplary embodiments have been described herein, various changes in form and detail may be made without departing from the intended scope of the claims appended hereto.

The invention claimed is:

1. A method performed by one or more processors of a computing device, comprising:

storing mappings of cycles to a client-facing workload of a client in a storage, wherein each of the cycles is a batch of computational jobs that can be performed in aggregate;

storing mappings of milestones to the cycles in the storage to identify ones of the milestones that are part of respective ones of the cycles, wherein each of the milestones is an action or event in the client-facing workload;

storing mappings of computational jobs that are running in an application network to ones of the milestones that are achieved by executing the computational jobs for the client in the storage;

with the one or more processors of the computing device, obtaining status data regarding computational jobs that are running in an application network from a selected data source from a plurality of heterogeneous data sources;

for each data source of the plurality of heterogenous data sources, with the one or more processors of the computing device, applying a set of rules for the selected data source to transforming the status data regarding the computational jobs from the selected data source to a standard format;

storing the transformed data in the standard format in a database;

providing the transformed data to a machine learning model as input;

receiving as output from the machine learning model, based at least in part on the input, estimated end times for the cycles in the client-facing workload, wherein the machine learning model has been trained on historical status data;

determining, whether the cycles of the client-facing workload are delayed or not based on the estimated end times for the cycles;

with the one or more processors of the computing device, generating a user interface that displays whether the cycles of the client-facing workload are delayed or not; and causing the user interface to be displayed on a display device.

2. The method of claim 1, wherein the user interface includes an indication that one of the cycles is executing on time or that one of the cycles is delayed in executing.

3. The method of claim 1, wherein the user interface includes an indication that one of the milestones is being executed.

4. The method of claim 1, wherein the analyzing of the transformed status data regarding the computational jobs with the machine learning model determines estimated end times for milestones for a selected one of the cycles.

5. The method of claim 4, further comprising determining whether the milestones of the selected cycle are delayed or not based on the estimated end times for the milestones of the selected cycle.

6. The method of claim 1, wherein the obtaining status data regarding the jobs, comprises making an Application Program Interface (API) call to obtain the status data from the selected data source.

7. The method of claim 6, wherein the status data regarding the jobs is obtained from a job scheduling tool that schedules the jobs for execution.

8. The method of claim 1, further comprising training the machine learning model on historical status data regarding previously executed computational jobs stored in an online analytical processing (OLAP) database prior to the analyzing of the transformed status data.

9. A non-transitory computer-readable storage medium storing computer programming instructions for execution by a processor of a computing device to cause the processor to:

store mappings of cycles to a client-facing workload of a client in a storage, wherein each of the cycles is a batch of computational jobs that can be performed in aggregate;

store mappings of milestones to the cycles in the storage to identify ones of the milestones that are part of respective ones of the cycles, wherein each of the milestones is an action or event in the client-facing workload;

store mappings of computational jobs that are running in an application network to ones of the milestones that are achieved by executing the computational jobs for the client in the storage;

obtain status data regarding computational jobs that are running as part of batch cycle processing in an application network from a selected data source from a plurality of heterogeneous data sources;

for the selected data source, apply a set of rules for the selected data source to transform the status data regarding the computational jobs from the selected data source to a standard format;

store the transformed data in the standard format in a database;

provide the transformed data to a machine learning model as input;

receive as output from the machine learning model, based at least in part on the input, estimated end times for the cycles in the client-facing workload, wherein the machine learning model has been trained on historical status data;

determine whether the cycles of the client-facing workload are delayed or not based on the estimated end times for the cycles;

generate a user interface that displays whether the cycles of the client-facing workload are delayed or not; and cause the user interface to be displayed on a display device.

10. The non-transitory computer-readable storage medium of claim 9, wherein the user interface includes an indication that one of the cycles is executing on time or that one of the cycles is delayed in executing.

11. The non-transitory computer-readable storage medium of claim 9, wherein the user interface includes an indication that one of the milestones is being executed.

12. The non-transitory computer-readable storage medium of claim 9, wherein the analyzing of the transformed status data regarding the computational jobs with a trained machine learning model determines estimated end times for milestones for a selected one of the cycles.

13. The non-transitory computer-readable storage medium of claim 12, further comprising determining whether the milestones of the selected cycle are delayed or not based on the estimated end times for the milestones of the selected cycle.

14. The non-transitory computer-readable storage medium of claim 9, wherein the obtaining status data regarding the jobs, comprises making an Application Program Interface (API) call to obtain the status data from the selected data source.

15. The non-transitory computer-readable storage medium of claim 14, wherein the status data regarding the computational jobs is obtained from a job scheduling tool that schedules the jobs for execution.

16. A method performed by a processor of a computing device, comprising:

storing mappings of cycles to a client-facing workload of a client in a storage, wherein each of the cycles is a batch of computational jobs that can be performed in aggregate;

storing mappings of milestones to the cycles in the storage to identify ones of the milestones that are part of respective ones of the cycles, wherein each of the milestones is an action or event in the client-facing workload;

storing mappings of computational jobs that are running in an application network to ones of the milestones that are achieved by executing the computational jobs for the client in the storage, at the processor of the computing device, receiving status data regarding at least some of computational jobs;

providing the transformed data to a machine learning model as input;

receiving as output from the machine learning model, based at least in part on the input, estimated end times for the cycles in the client-facing workload, wherein the machine learning model has been trained on historical status data;

determining whether the milestones of the selected cycle are delayed or not based on the estimated end times for the cycles;

with the one or more processors of the computing device, generating a user interface that displays whether the milestones of the selected cycle are delayed or not; and causing the user interface to be displayed on a display device.

17. The method of claim 16, wherein the user interface also displays status information regarding the selected cycle.

* * * * *